(12) United States Patent
Itoh et al.

(10) Patent No.: US 7,475,005 B2
(45) Date of Patent: Jan. 6, 2009

(54) TRANSLATION SYSTEM, DICTIONARY UPDATING SERVER, TRANSLATION METHOD, AND PROGRAM AND RECORDING MEDIUM FOR USE THEREIN

(75) Inventors: Harumi Itoh, Machida (JP); Yoshiroh Kamiyama, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 897 days.

(21) Appl. No.: 10/802,169

(22) Filed: Mar. 17, 2004

(65) Prior Publication Data

US 2004/0186706 A1  Sep. 23, 2004

(30) Foreign Application Priority Data

Mar. 17, 2003 (JP) ............................. 2003-072324

(51) Int. Cl.
*G06F 17/28* (2006.01)

(52) U.S. Cl. ................. 704/5; 707/2; 707/4; 707/10
(58) Field of Classification Search ............... 704/5, 704/2, 4, 10
See application file for complete search history.

(56) References Cited

U.S. PATENT DOCUMENTS

| | | | | |
|---|---|---|---|---|
| 5,323,311 A | * | 6/1994 | Fukao et al. ............... | 704/2 |
| 5,477,450 A | * | 12/1995 | Takeda et al. ............. | 704/2 |
| 6,275,789 B1 | * | 8/2001 | Moser et al. .............. | 704/7 |
| 6,862,566 B2 | * | 3/2005 | Wakita et al. ............. | 704/2 |
| 2002/0065647 A1 | * | 5/2002 | Hatori et al. ............. | 704/2 |
| 2003/0088568 A1 | * | 5/2003 | Matsunaga et al. ....... | 707/10 |
| 2003/0191626 A1 | * | 10/2003 | Al-Onaizan et al. ...... | 704/8 |
| 2004/0098247 A1 | * | 5/2004 | Moore ...................... | 704/4 |

FOREIGN PATENT DOCUMENTS

| | | |
|---|---|---|
| JP | 03-260764 A | 11/1991 |
| JP | 04/167063 | 6/1992 |
| JP | 06-19968 A | 1/1994 |
| JP | 028391 | 2/1994 |
| JP | 06/251055 | 9/1994 |
| JP | 07-182342 A | 7/1995 |
| JP | 128396 | 5/1997 |
| JP | 297588 | 10/2002 |

OTHER PUBLICATIONS

Katoh, "Word Selection by Searching the Translation Candidates on Monolingual Texts in Target Language," Jul. 9, 1993, vol. 93, No. 132., Technical Report of IEICE.

* cited by examiner

*Primary Examiner*—David R Hudspeth
*Assistant Examiner*—Qi Han
(74) *Attorney, Agent, or Firm*—Jerry W. Herndon; Steven M. Greenberg; Carey Rodriguez Greenberg & Paul LLP

(57) ABSTRACT

A translation system limits the reduction in translation accuracy accompanying an increase in new words and phrases. The system is configured to extract a noun phrase from a document and select a category for the noun phrase. The system is further configured to generate a translation for the phrase and to register the phrase, together with its translation, on a categorized dictionary corresponding to the selected category.

10 Claims, 11 Drawing Sheets

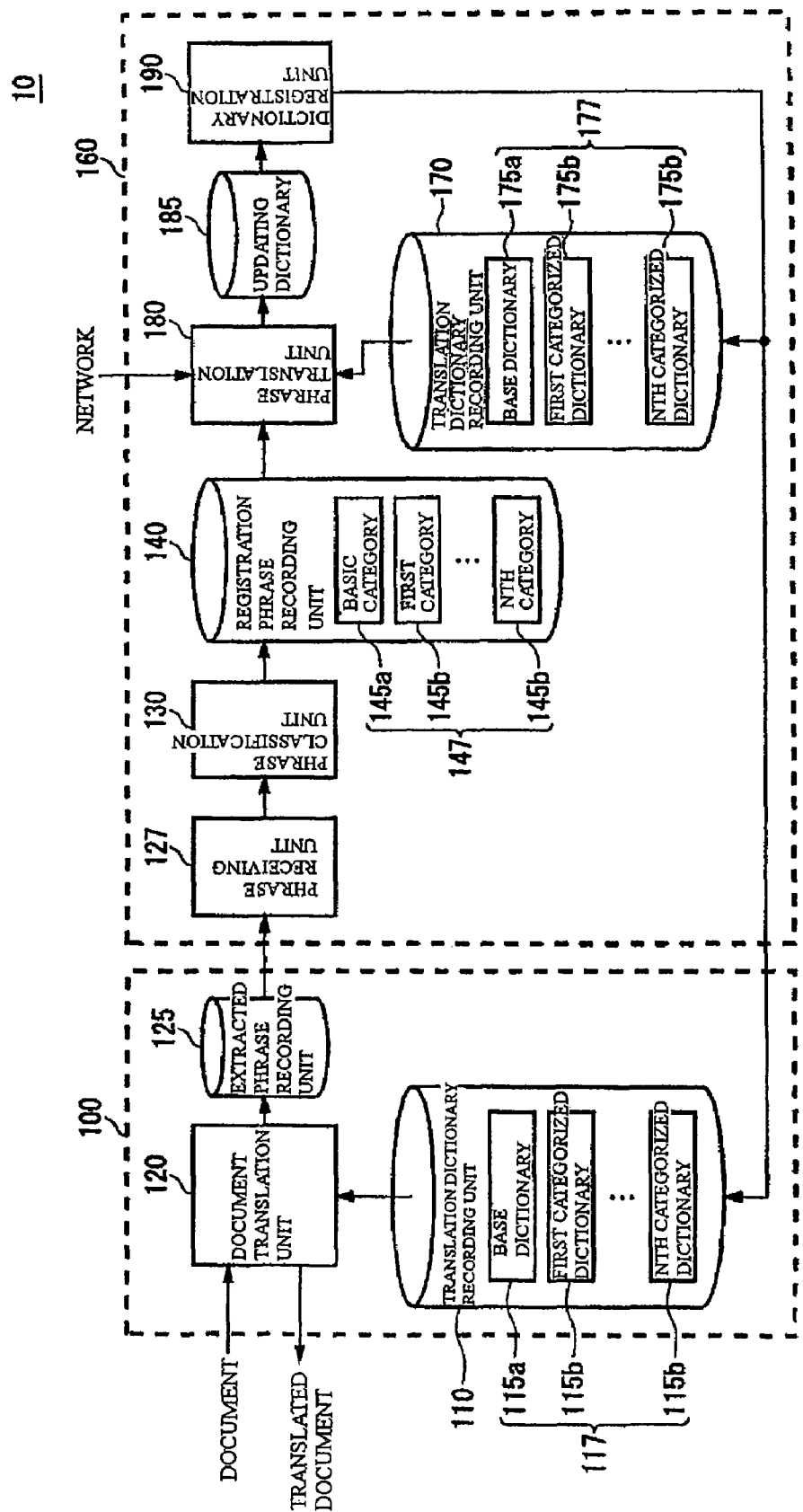
[Figure 1]

[Figure 2]
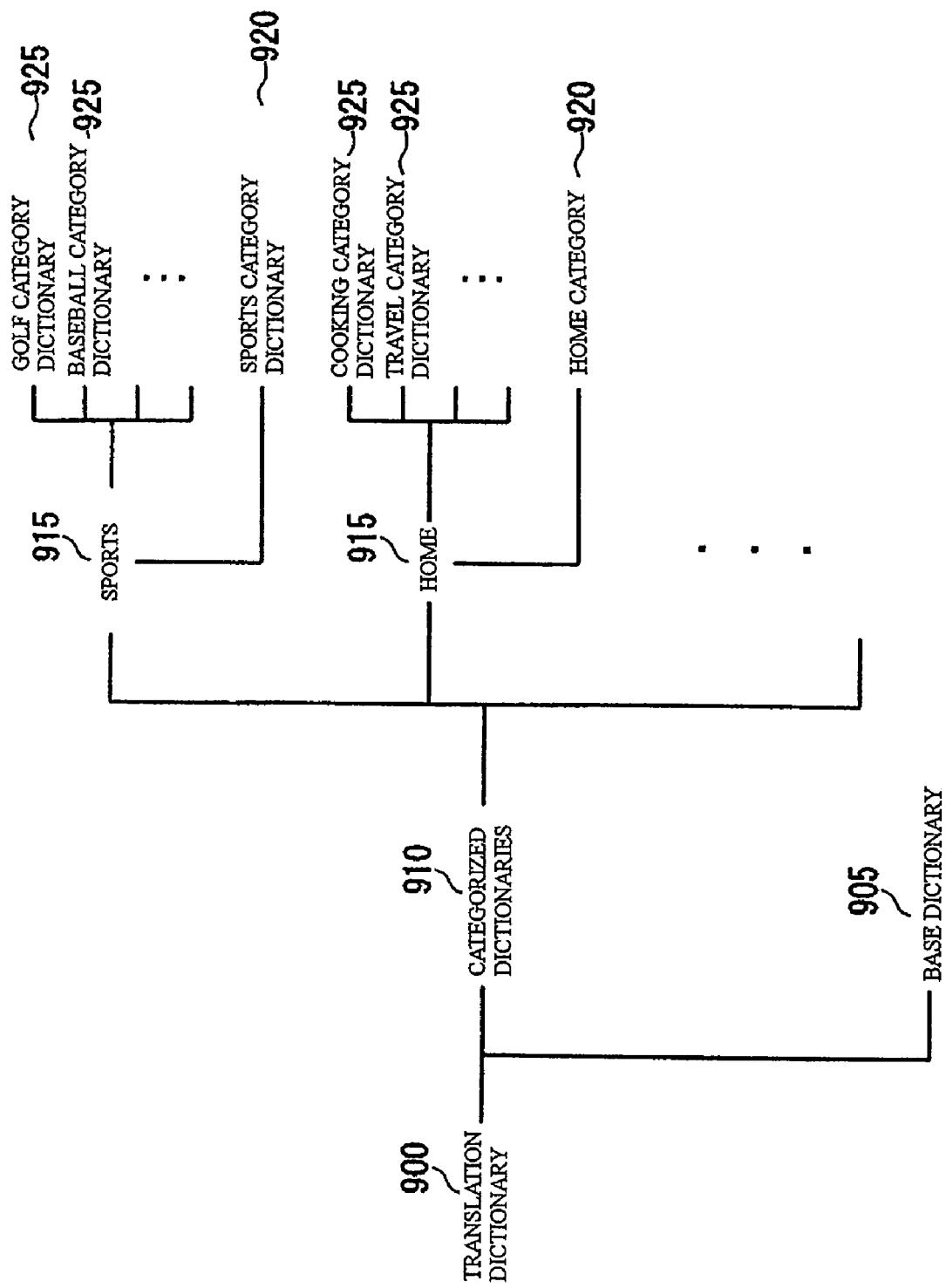

[Figure 3]
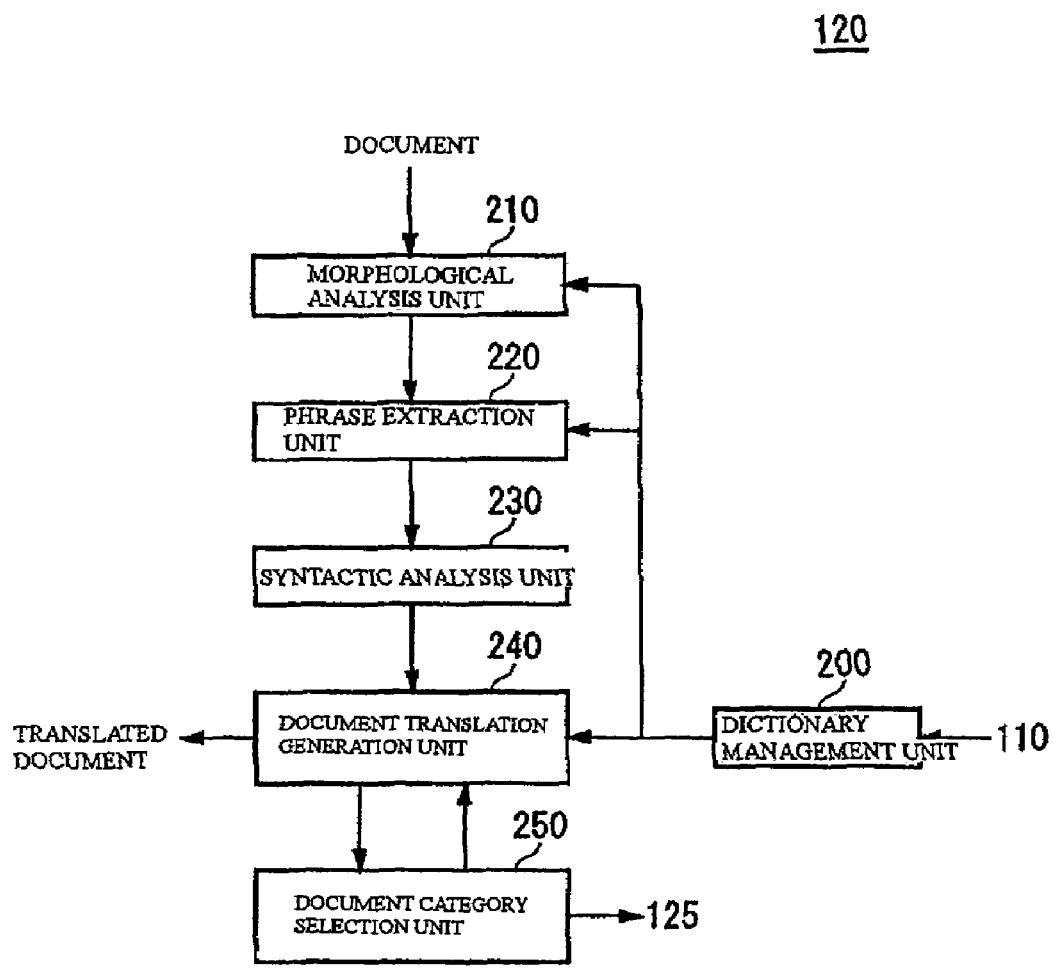

[Figure 4]
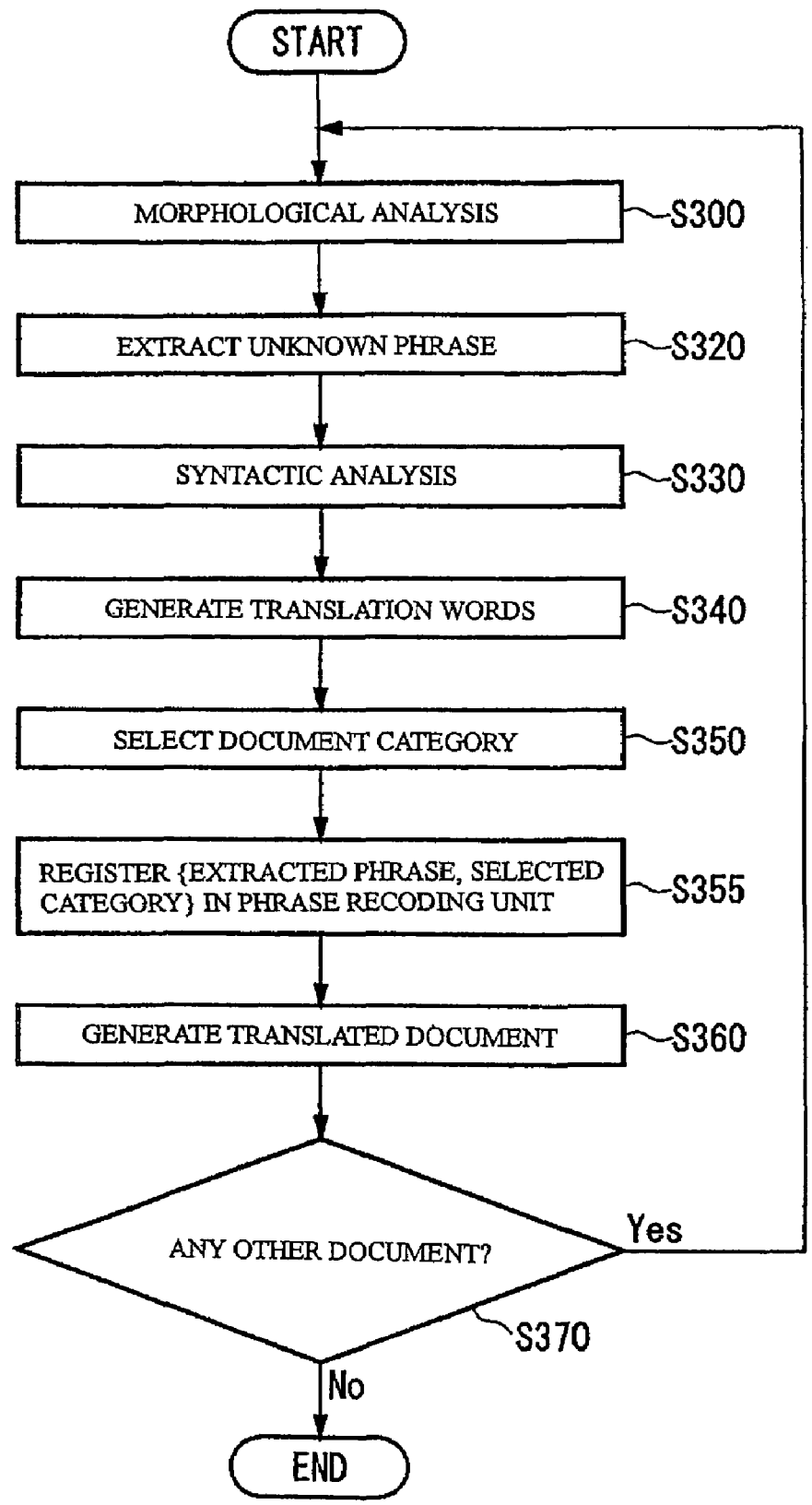

[Figure 5]
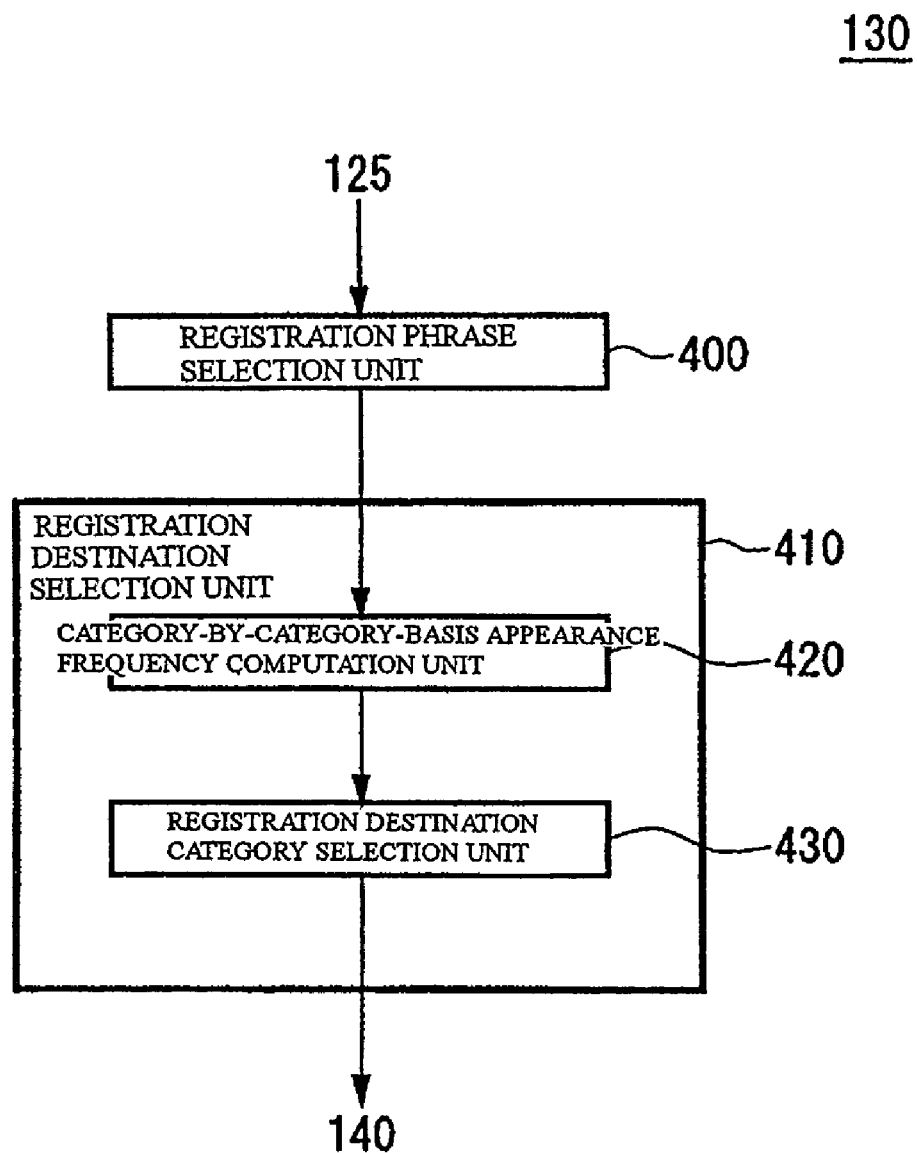

[Figure 6]
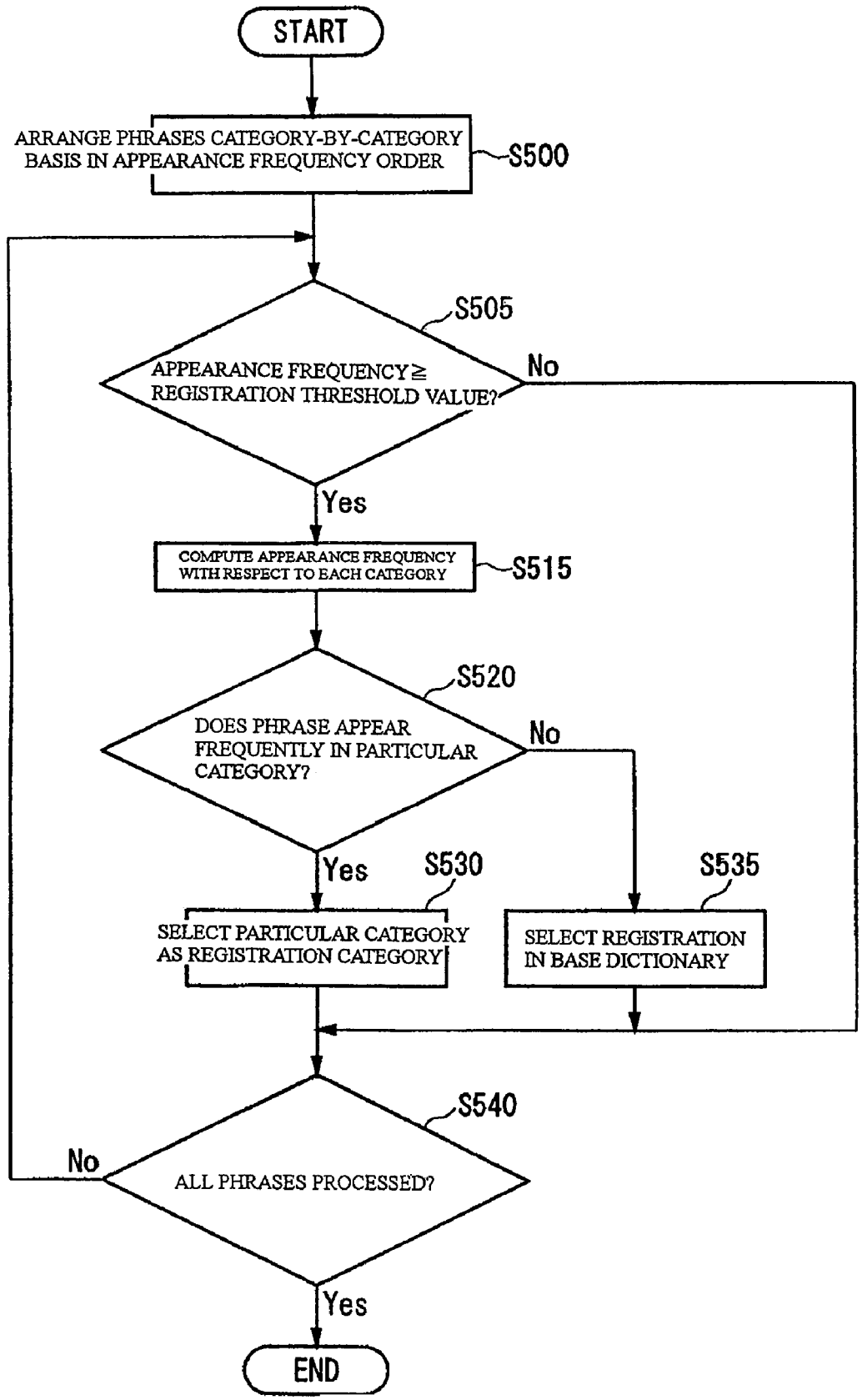

[Figure 7]
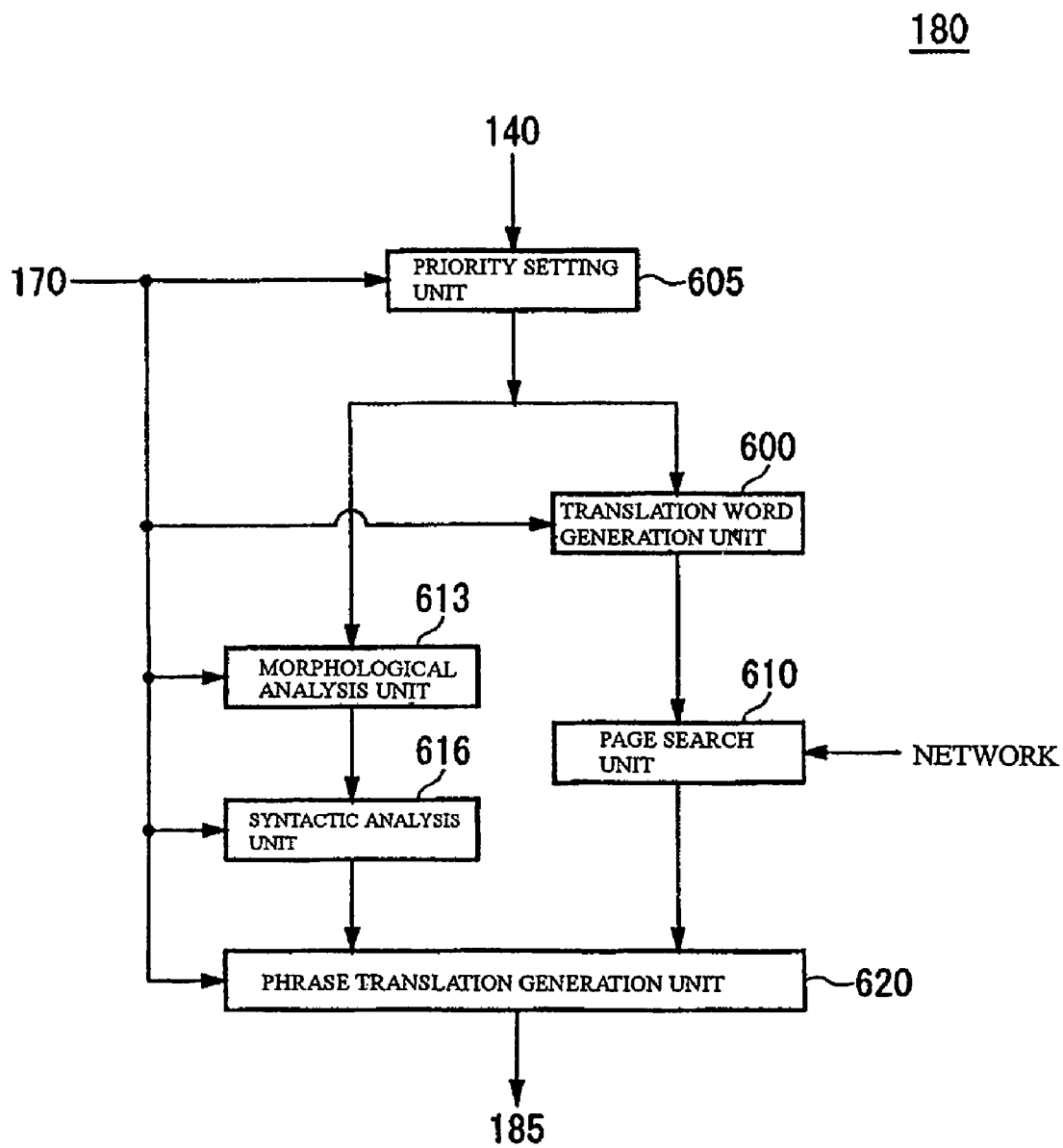

[Figure 8]
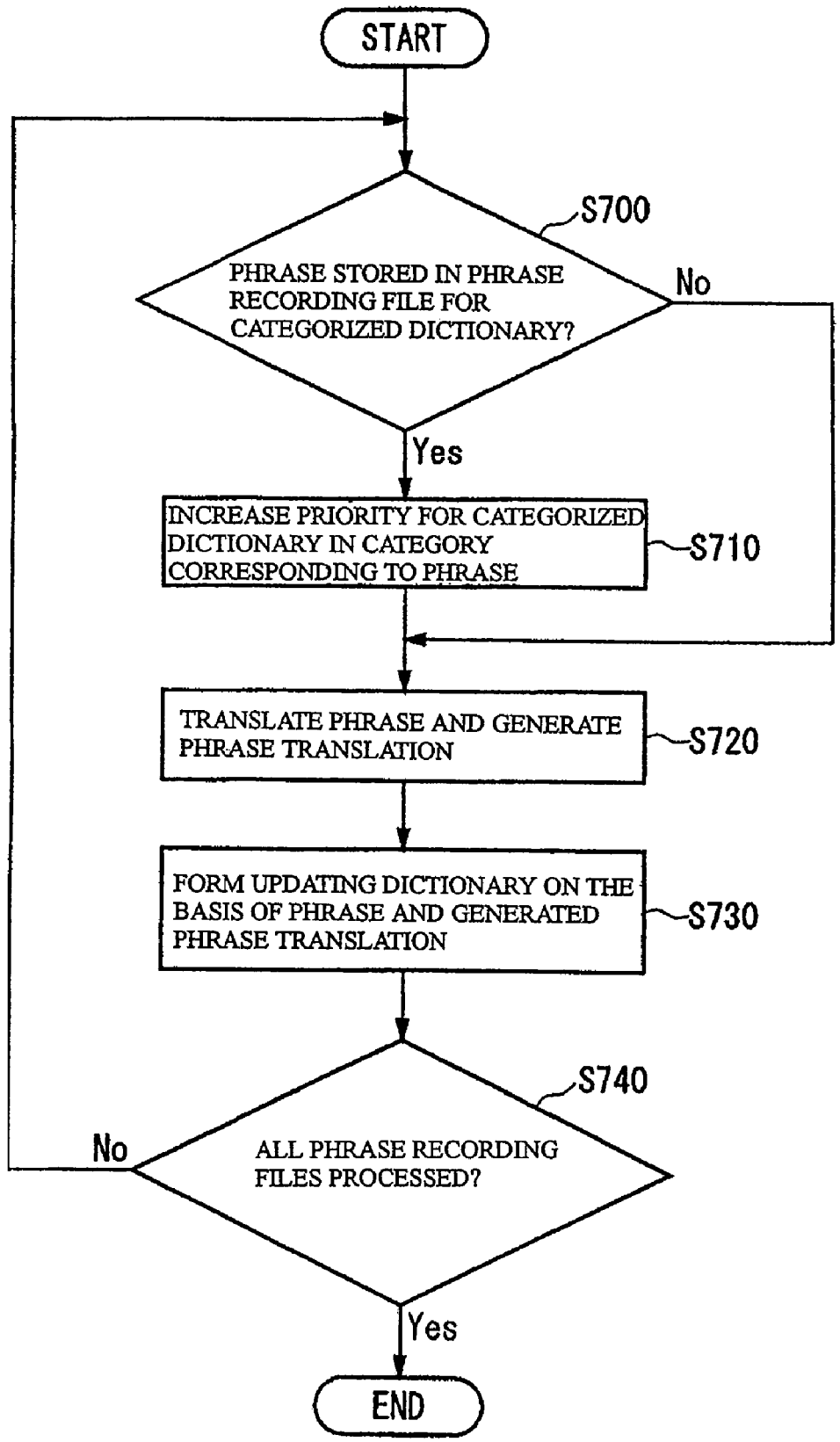

[Figure 9]
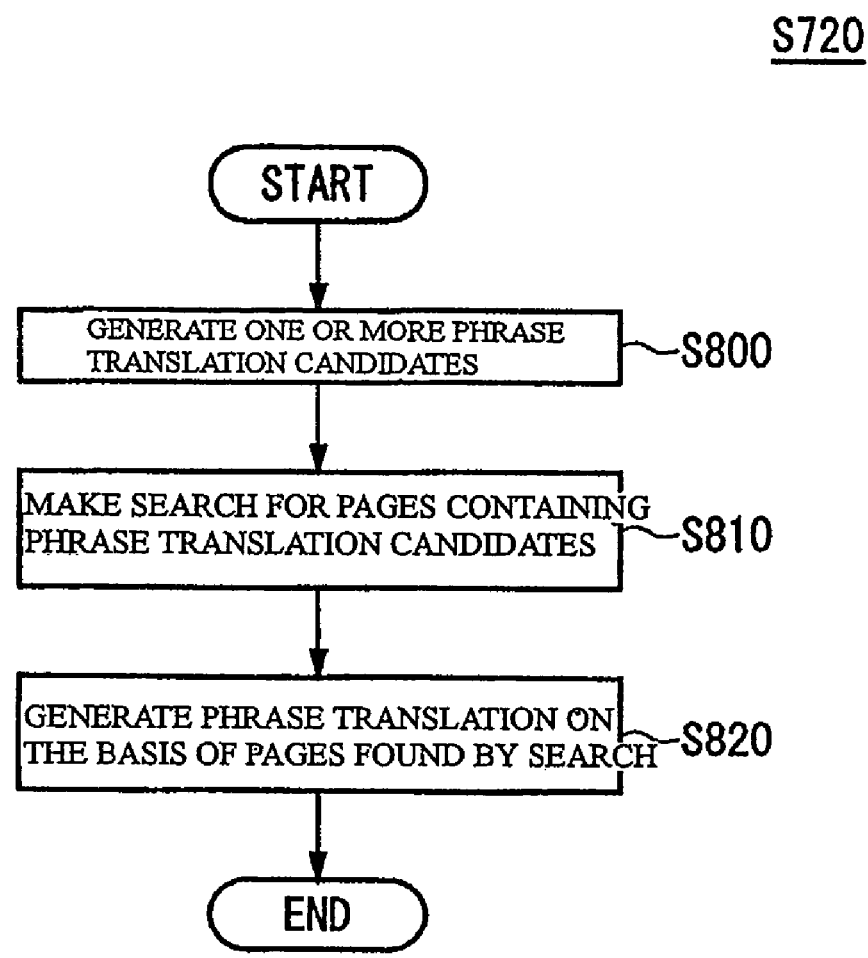

[Figure 10]
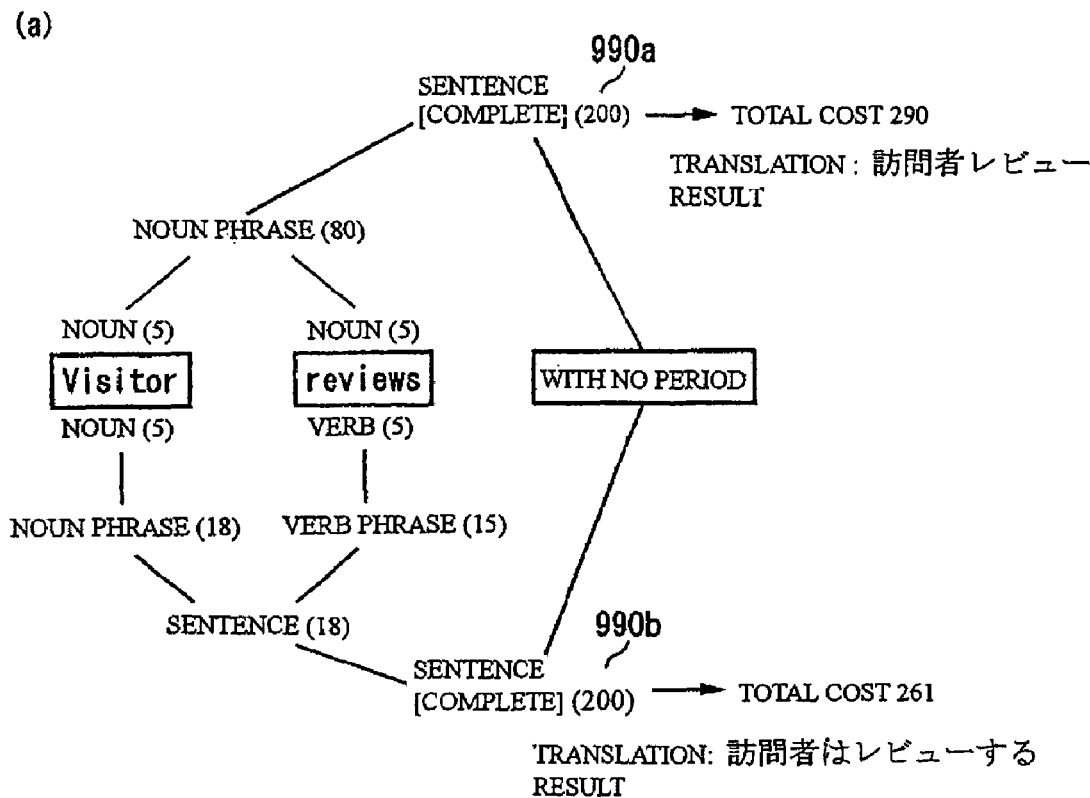
(a)
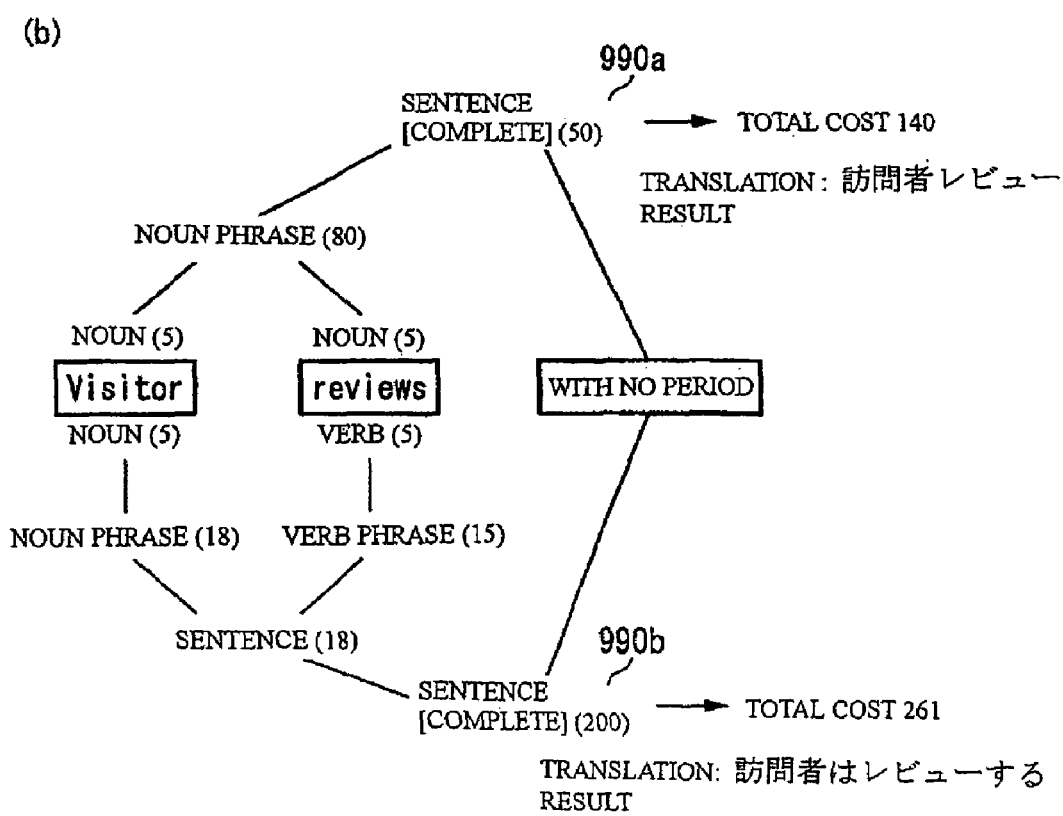
(b)

[Figure 11]
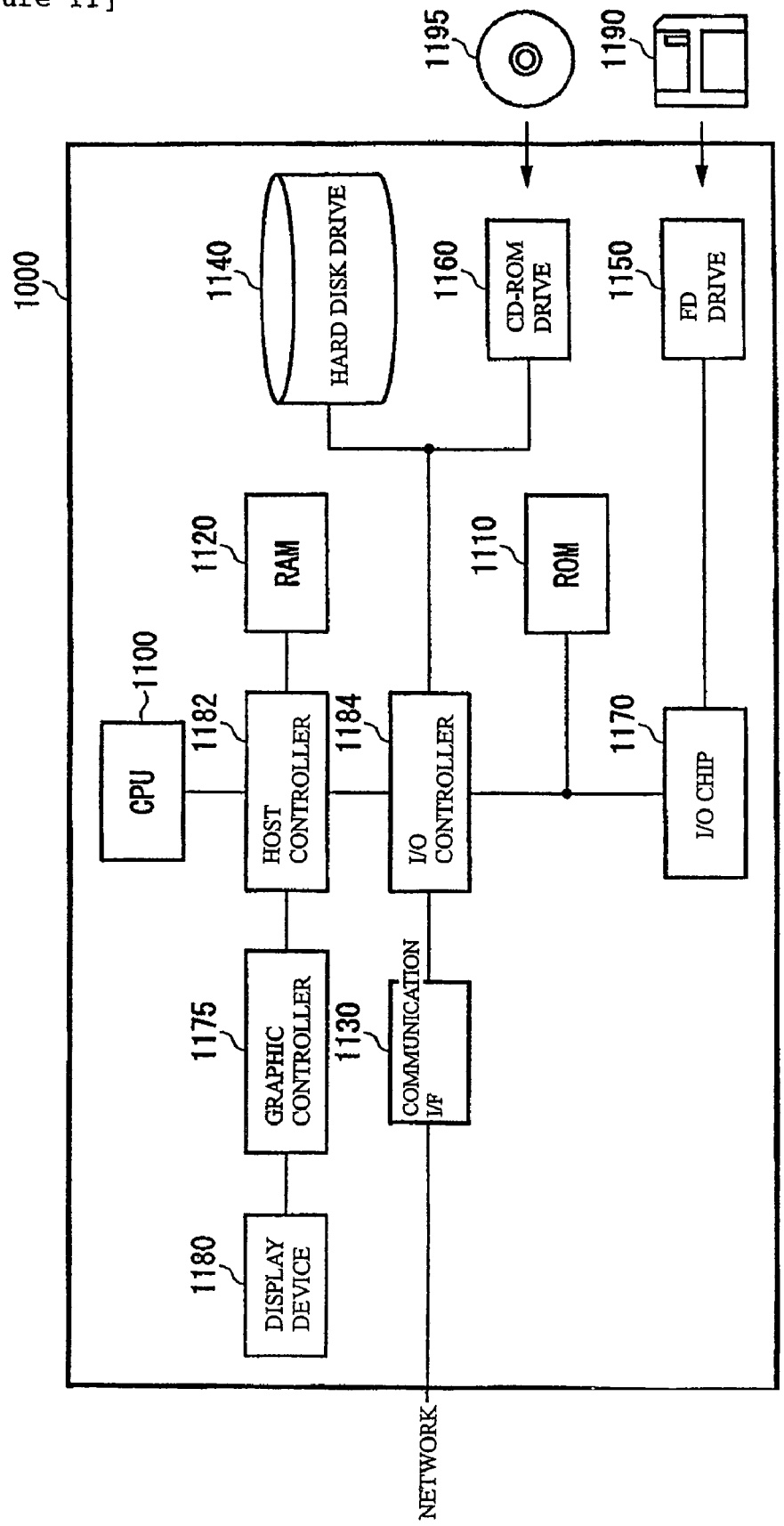

TRANSLATION SYSTEM, DICTIONARY UPDATING SERVER, TRANSLATION METHOD, AND PROGRAM AND RECORDING MEDIUM FOR USE THEREIN

DETAILED DESCRIPTION OF THE INVENTION

1. Field of the Invention

The present invention relates to a translation system, a dictionary updating server, a translation method, and a program and recording medium for use in the system, server and method. More particularly, the present invention relates to a translation system, a dictionary updating server and a translation method with a translation dictionary used for translation of documents being automatically updated, and to a program and recording medium for use in the system, server and method.

2. Background Art

Three techniques described below have been disclosed as a technique usable for the purpose of improving the accuracy of translation in a translation system for translating documents.

The first disclosed technique is a method in which character sequences for headwords of a dictionary are generated on the basis of words designated as objects to be manipulated, and are entered in the dictionary (see patent document 1).

The second disclosed technique is a method in which data on the relationship between original words and translations of the words is extracted from a text in a first language and a text in a second language translated from the text in the first language to form a dictionary in which the words and the translations of the words are juxtaposed (see patent document 2).

The third disclosed technique is a method of forming a dictionary in which part of a translated sentence is expressed by a variable on the basis of an example of translation and another example of translation formed by changing a word forming part of the first example of the translation (see patent document 3).

[Patent Document 1]
Published Unexamined Patent Application No. 6-28391
[Patent Document 2]
Published Unexamined Patent Application No. 9-128396
[Patent Document 3]
Published Unexamined Patent Application No. 2002-297588

Problems to be Solved by the Invention

With the development of technologies and the globalization of business in recent years, many new words have been made almost every day and part of them have rapidly become widespread. Under such circumstances, translation systems for translating documents have a problem that if a user or any other operator or the like does not enter translations of new words or phrases, the probability of a word or a phrase to be translated having been entered in a translation dictionary is reduced, resulting in a reduction in translation accuracy.

Since each of the techniques described in the above-mentioned patent documents 1 to 3 does not provide the function of entering translations corresponding to new words or phrases in a dictionary and is therefore incapable of solving the above-described problem.

It is, therefore, an object of the present invention to provide a translation system, a dictionary updating server and a translation method as a solution of the above-described problem and a program and recording medium for use in the system, server and method. This object can be attained by a combination of features described in the independent claims in the appended claims. In the dependent claims, further advantageous examples of the present invention are specified.

SUMMARY OF THE INVENTION

That is, according to a first form of the present invention, there are provided a translation system for translating a document, the translation system having a dictionary management unit for managing a plurality of categorized dictionaries classified according to predetermined categories, a phrase extraction unit for extracting a noun phrase from the document, a registration destination selection unit for selecting a category on which the extracted noun phrase should be registered among a plurality of categories corresponding to the plurality of categorized dictionaries, respectively, a translation unit for translating the noun phrase to generate a noun phrase translation which is a translation of the noun phrase, and a dictionary registration unit for registering a pair of the noun phrase and the noun phrase translation on the categorized dictionary corresponding to the category selected by the registration destination selection unit, a dictionary updating server and a terminal constituting this translation system, a translation method, and a program and a recording medium for use in the system, server, terminal and method.

In the above-described summary of the invention, not all the necessary features of the present invention are listed. Subcombinations of the features can constitute the present invention.

PREFERRED EMBODIMENT

The present invention will be described with respect to an embodiment thereof. The embodiment described below, however, is not limiting of the invention set forth in the appended claims, and all combinations of features described in the description of the embodiment are not necessarily indispensable to the solution according to the present invention.

FIG. 1 shows the configuration of a translation system 10 which represents an embodiment of the present invention. The translation system 10 of this embodiment extracts an unknown phrase during translation processing and generates a translation of the extracted phrase by translation. The translation system 10 is provided with the objective of limiting the reduction in translation accuracy accompanying an increase in unknown words in such a manner that a phrase and a translation of the phrase are entered as a pair in a translation dictionary to automatically enlarge a vocabulary.

The translation system 10 includes a translation front end system 100 in which a document is translated and from which a translated document obtained as a result of translation is output, and a dictionary updating server 160 which updates the translation dictionary of the translation front end system 100 by generating a translation of a phrase extracted by the translation front end system 100.

The translation front end system 100 translates a document designated by a user, an application program or the like. The translation front end system 100 may be implemented on a terminal such as a user's personal computer, PDA or portable telephone using the results of translation. Alternatively, the translation front end system 100 may be implemented on a server which is accessed through a communication network by a user using a browser or the like. Also, the dictionary updating server 160 may be implemented on the server on which the translation front end system 100 is implemented.

The translation front end system 100 has a translation dictionary recording unit 110, a document translation unit 120 and an extracted phrase recording unit 125.

The translation dictionary recording unit 110 stores a translation dictionary 117 used for translation by the translation front end system 100. The translation dictionary 117 includes a plurality of categorized dictionaries 115a and 115b respectively corresponding to a plurality of categories. In the categorized dictionaries 115b, translations of words, phrases and the like classified into categories, e.g., sports, home, business and science are registered. In the categorized dictionary 115a, words, phrases and the like not classified into any of the plurality of categories corresponding to the other categorized dictionaries 115, i.e., the plurality of categorized dictionaries 115b, and translations of them are registered. That is, words, phrases and the like not belonging to any of the plurality of categories corresponding to the plurality of categorized dictionaries 115b are registered in the categorized dictionary 115a. At least one of the categorized dictionaries 115 may be used with priority according to the category of a document to be translated. Further, each of the categorized dictionaries 115a and 115b may function as a grammar dictionary in which grammatical rules used for translation by the translation front end system 100 are stored.

The document translation unit 120 translates a document described in a first language such as English into a translated document described in a second language such as Japanese. In translation processing, the document translation unit 120 extracts an unknown phrase and outputs to the extracted phrase recording unit 125 the extracted unknown phrase and the category of the document. The document translation unit 120 may select the category of a document, for example, on the basis of the contents of the document. Alternatively, the document translation unit 120 may set a document category on the basis of a designation from a user.

The extracted phrase recording unit 125 stores a phrase extracted from a document by the document translation unit 120 by relating the phrase to the phrase appearance category. The phrase appearance category is the category of the document in which the phrase has appeared. The extracted phrase recording unit 125 transmits stored pairs of phrases and appearance categories to the dictionary updating server 160, for example, periodically or according to predetermined timing.

The dictionary updating server 160 generates a translation of a phrase received from the extracted phrase recording unit 125 of the translation front end system 100 to update the translation dictionary of the translation front end system 100. The dictionary updating server 160 may be implemented together with the translation front end system 100 on a terminal for a user who will use translation results. Alternatively, the dictionary updating server 160 may be implemented together with the translation front end system 100 on a server which is accessed through a communication network by a user using a browser or the like, or may be implemented on a server which communicates with a server on which the translation front end system 100 is implemented, through a communication network.

The dictionary updating server 160 has a phrase receiving unit 127, a phrase classification unit 130, a registration phrase recording unit 140, a translation dictionary recording unit 170, a phrase translation unit 180, an updating dictionary 185, and a dictionary registration unit 190.

The phrase receiving unit 127 receives from the extracted phrase recording unit 125 a phrase extracted from a document to be translated. The phrase classification unit 130 selects a phrase to be registered in the translation dictionary 117 from phrases received from the extracted phrase recording unit 125 via the phrase receiving unit 127, and selects a registration category in which the phrase should be registered. When a phrase is registered in the categorized dictionary 115a, the phrase and a registration category (basic category) are stored in a category-by-category registration phrase recording file 145a in the registration phrase recording unit 140. When a phrase is registered in the categorized dictionary 115b, the phrase and a registration category are stored in a category-by-category registration phrase recording file 145b in the registration phrase recording unit 140. The registration phrase recording unit 140 supplies to the phrase translation unit 180 data on phrases and registration categories for the phrases stored in the category-by-category registration phrase recording files 145a and 145b.

The translation dictionary recording unit 170 has the same function as the translation dictionary recording unit 110 and stores a translation dictionary 177 used for translation phrases received from the translation front end system 100. Categorized dictionaries 175a and 175b contained in the translation dictionary 177 may be updated in synchronization with updating of the categorized dictionaries 115a and 115b to have the same contents as those in the categorized dictionaries 115a and 115b. Alternatively, the translation front end system 100 or the dictionary updating server 160 registers part of the contents of the categorized dictionaries 175a and 175b in the categorized dictionaries 115a and 115b. In a case where the translation front end system 100 and the dictionary updating server 160 are provided on one terminal or one server for example, an arrangement may be adopted in which the translation dictionary recording unit 110 is directly connected to the phrase translation unit 180 instead of the translation dictionary recording unit 170, and the phrase translation unit 180 directly uses the translation dictionary recording unit 110.

The phrase translation unit 180 is an example of the translation unit in accordance with the present invention. The phrase translation unit 180 generates phrase translations by translating phrases received from the translation front end system 100 to form an updating dictionary used for updating of the translation dictionary 117 and the translation dictionary 177. In the updating dictionary 185, the updating dictionary formed by the phrase translation unit 180 is stored. The dictionary registration unit 190 registers pairs of phrases and phrase translations in the translation dictionary 117 and the translation dictionary 177 on the basis of the updating dictionary in the updating dictionary 185. The dictionary registration unit 190 registers a pair of a phrase and a phrase translation in the categorized dictionary 115b and the categorized dictionary 175b corresponding to the registration category for the phrase. If the registration category for the phrase is not classified into any of the categories corresponding to the categorized dictionaries 115b, that is, if the registration category for the phrase is the basic category, the pair of the phrase and the phrase translation is registered in the base dictionary 115a and the categorized dictionary 175a.

When the dictionary registration unit 190 registers a pair of a phrase and a phrase translation to the corresponding one of the categorized dictionaries 115, it sends an instruction to the translation dictionary recording unit 110 make the same register the pair of the phrase and the phrase translation. According to the registration instruction from the dictionary registration unit 190, the translation dictionary recording unit 110 registers the pair of the phrase and the phrase translation in the categorized dictionary 115 corresponding to the selected category.

In the above-described translation system 10, the dictionary updating server 160 can generate a translation of a phrase extracted from a document to be translated by the translation front end system 100, and register the translation of the phrase in the categorized dictionary 115 corresponding to the phrase. Thus, the vocabulary of the translation dictionary corresponding to the category of a translated document can be increased to limit the reduction in translation accuracy accompanying an increase in unknown words.

The above-described translation front end system 100 and dictionary updating server 160 may be implemented by a combination of components different from that shown in FIG. 1. For example, the phrase classification unit 130 and registration phrase recording unit 140 may be implemented as components of the translation front end system 100 instead of being implemented as components of the dictionary updating server 160.

FIG. 2 shows an example of the hierarchical structure of the translation dictionary 117 and the translation dictionary 177 stored in the translation dictionary recording unit 110 and the translation dictionary recording unit 170 in this embodiment. A dictionary 900 corresponding to the translation dictionary 117 and the translation dictionary 177 is placed in the highest position in the hierarchical structure. The dictionary 900 is divided into categorized dictionaries 910 classified according to categories, and a base dictionary 905 in which words and phrases not classified into any of the plurality of categories corresponding to the categorized dictionaries 910. The categorized dictionaries 910 fall into a plurality of main categories 915 such as "sports" and "home". In correspondence with each of the main categories 915, sub-categorized dictionaries 925 and a main categorized dictionary 920 are provided. The sub-categorized dictionaries 925 correspond to sub-categories which are categories further divided from each of the main categories 915. The main categorized dictionary 920 is a dictionary in which words, phrases or the like not belonging to any of the sub-categories in the main category 915 are registered.

Each of the categorized dictionaries 115b and the categorized dictionaries 175b may correspond to sub-categorized dictionaries 925. In such a case, the categorized dictionary 115a and the categorized dictionary 175a in which words and phrases not classified into any of the plurality of categories corresponding to the plurality of categorized dictionaries 115b and the plurality of categorized dictionaries 175b are registered may correspond to the main categorized dictionaries 920, or may alternatively correspond to the base dictionary 905.

Each of the categorized dictionaries 115b and the categorized dictionaries 175b may include the plurality of sub-categorized dictionaries 925 and the main categorized dictionary 920 corresponding to one of the main categories 915. In such a case, the categorized dictionary 115a and the categorized dictionary 175a may correspond to the base dictionary 905.

FIG. 3 shows the configuration of the document translation unit 120 in this embodiment. The document translation unit 120 has a dictionary management unit 200, a morphological analysis unit 210, a phrase extraction unit 220, a syntactic analysis unit 230, a document translation generation unit 240, and a document category selection unit 250.

The dictionary management unit 200 manages the plurality of categorized dictionaries 115 recorded in the translation dictionary recording unit 110. The morphological analysis unit 210 performs morphological analysis on each of sentences contained in a document. The phrase extraction unit 220 extracts phrases from the document on the basis of morphological analysis. The syntactic analysis unit 230 analyzes the syntax of each sentence contained in the document on the basis of the results of morphological analysis. The document translation generation unit 240 generates a translated document by translating the document on the basis of the morphological analysis results and the syntactic analysis results by referring to the plurality of categorized dictionaries 115 through the dictionary management unit 200. The document category selection unit 250 selects the category of the document on the basis of the frequencies with which the plurality of categorized dictionaries 115 have been used by the document translation generation unit 240 in translation of the document.

FIG. 4 shows the flow of processing in the document translation unit 120 in this embodiment.

The morphological analysis unit 210 analyzes morphemes which are minimum units constituting each of sentences contained in a document and having meanings, and thereby recognizes words (S300). In this processing, the morphological analysis unit 210 refers to grammatical rules stored in the categorized dictionaries 115a and 115b and performs morphological analysis on the basis of the grammatical rules.

Subsequently, the phrase extraction unit 220 extracts unknown phrases from the document on the basis of the results of morphological analysis (S320). In this embodiment, the phrase extraction unit 220 extracts unknown noun phrases not registered in the translation dictionary 117. Alternatively, the phrase extraction unit 220 may extract various phrases including verb phrases. In S320, the phrase extraction unit 220 determines that a phrase is unknown in a case where no translation of the phrase recognized on the basis of the results of morphological analysis is registered in the plurality of categorized dictionaries 115.

Subsequently, the syntactic analysis unit 230 analyzes the syntax of each sentence contained in the document on the basis of the results of morphological analysis (S330). The document translation generation unit 240 then performs translation processing by referring to the plurality of categorized dictionaries 115 through the dictionary management unit 200 with respect to words and combinations of words such as phrases and the like in the document recognized on the basis of the results of morphological analysis and the results of syntactic analysis to generate translation words for word translations, phrase translations and the like (S340).

Subsequently, the document category selection unit 250 selects the category of the document on the basis of the frequencies with which the plurality of categorized dictionaries 115 have been used by the document translation generation unit 240 in translation of the document (S350). For instance, the document category selection unit 250 divides the number of times one of the plurality of categorized dictionaries 115 has been used by the numbers of times some of the plurality of categorized dictionaries 115 have been used, and obtains the result of this division as the frequency of occurrence of words, phrases and the like in the corresponding category contained in the document. If words, phrases and the like in one of the categories occur frequently in the document in comparison with words, phrases and the like in the other categories, the document category selection unit 250 selects this category as the category of the document. For example, in processing for this selection, if a category exists with which a frequency equal to or larger than a predetermined threshold value is obtained as the above-described frequency, the document category selection unit 250 may select this category as the category of the document.

The document category selection unit 250 then recognizes this document category as the category in which a plurality of phrases extracted from the document appears, and registers in the extracted phrase recording unit 125 the set of the phrases extracted from the document and this phrase appearance category (S355). In this registration, the document category selection unit 250 registers in the extracted phrase recording unit 125 the number of times each phrase appears in one of a plurality of documents to be translated as the frequency of appearance of the phrase by relating the frequency to the phrase. The document translation generation unit 240 translates the document by using with priority the categorized dictionary 115 corresponding to the category of the document (S360).

In a case where a plurality of documents to be translated exist, that is, for example, in a case where a user makes the translation system translate a plurality of documents one after another, the document translation unit 120 executes processing as steps S300 to S360 with respect to the plurality of documents (S370). The morphological analysis unit 210 performs morphological analysis on each of the plurality of documents, the phrase extraction unit 220 extracts one or more phrases from each of the plurality of documents, and the syntactic analysis unit 230 performs syntactic analysis on each of the plurality of documents. The document translation generation unit 240 generates a translation word or combination of translation words for each of words or combinations of words in the plurality of documents. The document category selection unit 250 selects the category of each of the plurality of document on the basis of the frequencies of use of the plurality of categorized dictionaries 115.

In the document translation unit 120, the syntactic analysis unit 230 can recognize a phrase without analyzing the construction of words forming the phrase, since the dictionary updating server 160 registers new phrases and phrase translations one after another in the plurality of categorized dictionaries 115. Consequently, the accuracy of syntactic analysis and the speed of grammatical analysis in the document translation unit 120 can be increased.

FIG. 5 shows the configuration of the phrase classification unit 130 in this embodiment. The phrase classification unit 130 has a registration phrase selection unit 400 and a registration destination selection unit 410.

The registration phrase selection unit 400 makes a selection as to whether or not each of phrases should be registered in the translation dictionary on the basis of the frequency with which the phrase appears in one or a plurality of documents. The registration destination selection unit 410 selects, with respect to each of the phrases extracted by the phrase extraction unit 220 and selected by the registration phrase selection unit 400 as phrases to be registered, one of the plurality of categories respectively corresponding to the plurality of categorized dictionaries 115 in which the phrase should be registered. The registration destination selection unit 410 includes a category-by-category-basis appearance frequency computation unit 420 and a registration destination category selection unit 430.

The category-by-category-basis appearance frequency computation unit 420 computes the frequency of appearance of a phrase with respect to each of the plurality of categories on the basis of the frequency of appearance of the phrase in one or more of the plurality of documents to be translated and the categories of the documents. The registration destination category selection unit 430 makes a selection as to in which one of the plurality of categorized dictionaries 115 each phrase should be registered, on the basis of the frequencies of appearance of the phrase in the plurality of categories.

FIG. 6 shows the flow of processing in the phrase classification unit 130 in this embodiment.

First, the registration phrase selection unit 400 rearranges one or more phrases received from the extracted phrase recording unit 125 according to the frequencies of appearance with respect to the categories (S500). Subsequently, if the frequency with which one of the phrases appears in one or a plurality of documents to be translated is lower than a predetermined lower limit value, the registration phrase selection unit 400 selects inhibiting the pair of the phrase and a translation of the phrase from being registered in any one of the plurality of categorized dictionaries 115 (S505). More specifically, the registration phrase selection unit 400 supplies the registration destination selection unit 410 with information about one or more phrases received from the extracted phrase recording unit 125 after removing from this information the information about the phrase selected as one not to be registered in any one of the categorized dictionaries 115.

Subsequently, the category-by-category-basis appearance frequency computation unit 420 computes the frequency of appearance of the phrase with respect to each of the plurality of categories on the basis of the frequency of appearance of the phrase in one or the plurality of documents to be translated (S515).

Subsequently, the registration destination category selection unit 430 makes a selection as to in which one of the categorized dictionary 115a and the plurality of categorized dictionaries 115b each phrase should be registered, on the basis of the frequencies of appearance of the phrase in the plurality of categories. More specifically, if the phrase appears frequently in one particular category (S520), this particular category is selected as a category in which the phrase should be registered and is stored in the category-by-category registration phrase recording file 145b by being related to this particular category (S530). If the phrase does not appear particularly frequently in any one of the categories (S520), registering the pair of the phrase and the translation of the phrase in the categorized dictionary 115a provided as the base dictionary is selected to store the phrase in the category-by-category registration phrase recording file 145a by relating the phrase to the basic category (S535). The phrase classification unit 130 performs the processing shown as the above-described steps S505 to S535 for all the phrases received from the extracted phrase recording unit 125 (S540).

By the above-described processing, the phrase classification unit 130 selects, with respect to one or more of a plurality of documents, the category in which the phrase extracted from one or more of the plurality of documents should be registered, on the basis of the frequency of appearance of the phrase.

For example, in a case where a phrase A appears with appearance frequencies d1, d2, and d3 in a document D1 in a category C1 and documents D2 and D3 in a category C2, the phrase classification unit 130 may select the category in which the phrase should be registered, by a method described below by way of example. If the appearance frequency (d1+d2+d3) of the phrase A does not satisfy the condition for registration of the phrase A, the registration phrase selection unit 400 selects inhibiting registration of the phrase in any one of the plurality of categorized dictionaries 115. In the case of registering the phrase A in one of the categorized dictionaries 115, the category-by-category-basis appearance frequency computation unit 420 computes the appearance frequency d1 in the category C1 and the appearance frequency (d2+d3) in the category C2 of the phrase A. The registration destination category selection unit 430 makes a determination as to in which one of the categories the phrase A appears particularly frequently on the basis of the appearance frequency d1 and the appearance frequency (d2+d3) to make a selection as to in which one of the categorized dictionaries 115 the phrase A should be registered.

The above-described phrase classification unit 130 selects registration of a phrase in the translation dictionary 117 if the phrase appears with a frequency higher than the lower limit in one or a plurality of documents. In the translation system 10, therefore, a phrase which appears with such a low frequency that the phrase cannot be classified with sufficiently high accuracy with respect to the categories is not registered in the translation dictionary 117, thus preventing a reduction in translation accuracy. While the phrase classification unit 130 selects registering a phrase appearing frequently in one particular category in the categorized dictionary 115b corresponding to the particular category, it also selects a phrase not appearing particular frequently in any category in the base dictionary 115a. In the translation system 10, therefore, a phrase can be registered in a suitable one of the categorized dictionaries 115 according to the category in which the phrase appears, thereby suitably increasing the vocabulary of the translation dictionary 117 so that the accuracy of translation results is improved.

A more concrete example of processing in the phrase classification unit 130 will be described.

First, the registration phrase selection unit 400 generates the following matrix (expression (1)) expressing the frequencies (the numbers of times) with which phrase $t_i$ appears in appearance category $d_j$ on the basis of phrases and phrase appearance categories received from the extracted phrase recording unit 125.

[Expression 1]

$$A = \begin{matrix} & d_1 & d_2 & d_3 & d_4 \\ t_1 & 10 & 0 & 0 & 1 \\ t_2 & 1 & 12 & 0 & 1 \\ t_3 & 3 & 5 & 3 & 2 \end{matrix} \quad (1)$$

Consider each phrase $t_i$ as a vector, where each element of the vector represents the phrase frequency for each category. Then, the degree of appearance of the phrase $t_i$ in the appearance category $d_j$ can be expressed, for example, by the degree of similarity of the phrase $t_i$ to the appearance category $d_j$ as shown by the following expression (2).

[Expression 2]

$$sim[\vec{t_i}, \vec{d_j}] = \frac{\vec{t_i} \cdot \vec{d_j}}{|\vec{t_i}| \cdot |\vec{d_j}|} \quad (2)$$

The category-by-category-basis appearance frequency computation unit 420 computes, as the appearance frequency of the phrase $t_i$ with respect to the appearance category $d_j$, an appearance frequency normalized by using the maximum frequency, as shown by the following expression (3) of $tf_{(i,j)}$ for example.

[Expression 3]

$$tf_{(i,j)} = K + (1 - K)\frac{A_{(i,j)}}{\max_{i,j}(A_{(i,j)})} \quad (3)$$

In expression (3), K is a constant by which the influence of the appearance frequency on the determination of registration/non-registration of the phrase is determined.

The registration destination category selection unit 430 makes a selection as to whether or not the phrase $t_i$ should be registered in the appearance category $d_j$ on the basis of the degree of appearance of the phrase $t_i$ in the appearance category $d_j$ and/or the frequency of appearance of the phrase $t_i$ in the appearance category $d_j$. At the time of selection as to whether or not the phrase $t_i$ should be registered in the appearance category $d_j$ on the basis of the degree of appearance of the phrase $t_i$ in the appearance category $d_j$ and the frequency of appearance of the phrase $t_i$ in the appearance category $d_j$, the registration destination category selection unit 430 may determine whether or not the phrase $t_i$ should be registered in the appearance category $d_j$ on the basis of the product of the degree of similarity shown by expression (2) and the appearance frequency shown by expression (3).

The phrase classification unit 130 performs the above-described processing with respect to a plurality of sub-categories to register phrases appearing particularly frequently in one of the sub-categories in the translation dictionary 117 and the translation dictionary 177, the phrases being registered in decreasing order of appearance frequency. After removing the phrase registered in one of the sub-categories by this processing, the phrase classification unit 130 again performs the above-described processing with respect to the plurality of main categories to register in the translation dictionary 117 and the translation dictionary 177 phrases not appearing particularly frequently in any one of the sub-categories but appearing frequently in one of the main categories, the phrases being registered in decreasing order of appearance frequency.

This embodiment may alternatively be such that in the above-described steps S520, S530 and S535 the registration destination category selection unit 430 selects a particular one of the categories as a category in which the phrase should be registered if the frequency of appearance of the phrase in the particular category is equal to or larger than a predetermined value, and selects registering the pair of the phrase and a translation of the phrase in the base dictionary, i.e., the categorized dictionary 115a, if the frequency of appearance of the phrase in the particular category is lower than the predetermined value.

FIG. 7 shows the configuration of the phrase translation unit 180 in this embodiment. The phrase translation unit 180 includes a priority setting unit 605, a translation word generation unit 600, a page search unit 610, a morphological analysis unit 613, a syntactic analysis unit 616, and a phrase translation generation unit 620.

The priority setting unit 605 selects, for each of phrases stored in the category-by-category registration phrase recording files 145a and 145b, one of the categorized dictionaries 175 to be used with priority for translation of the phrase. The translation word generation unit 600 translates each of the phrases stored in the category-by-category registration phrase recording files 145a and 145b to generate a phrase translation candidate which is a candidate for a phrase translation. The page search unit 610 searches pages on a network to find pages containing phrase translation candidates corresponding to the phrases. The morphological analysis unit 613 has the same configuration and function as those of the morphological analysis unit 210, and performs morphological analysis on each phrase to be analyzed. The syntactic analysis unit 616 has the same configuration and function as those of the syntactic analysis unit 230, and performs syntactic analysis on each phrase to be analyzed. The phrase translation generation unit 620 generates a phrase translation of each phrase on the basis of the results of morphological analysis and syntactic analysis or the result of page search performed by the page search unit 610.

FIG. 8 shows the flow of processing in the phrase translation unit 180 in this embodiment. The priority setting unit 605 first obtains in sequence the phrases stored in the categoryby-category registration phrase recording files 145a and 145b in the registration phrase recording unit 140, which phrases are to be registered in the translation dictionary 117. If the obtained phrase is a phrase stored in one of the category-by-category registration phrase recording files 145b (S700), the priority setting unit 605 increases the priority for the categorized dictionary 175b corresponding to the registration category which has been selected by the registration destination selection unit 430 and stored in the category-by-category registration phrase recording file 145 by being related to the phrase, and in which the phrase is to be registered, in comparison with the priorities for the other categorized dictionaries (S710). The priority setting unit 605 thereby determines prioritized use of the categorized dictionary 175b (S710). If the obtained phrase is a phrase stored in the category-by-category registration phrase recording file 145a (S700), the priority setting unit 605 determines equally-prioritized use of all the categorized dictionaries 175b.

Subsequently, the morphological analysis unit 613, the syntactic analysis unit 616, and the phrase translation generation unit 620 translate the translation-target phrase to generate a phrase translation as a translation of the phrase (S720). That is, the morphological analysis unit 613 performs morphological analysis on the analysis-object phrase by referring to the categorized dictionaries 175a and 175b. The syntactic analysis unit 616 then performs syntactic analysis on analysis-object phrase on the basis of the results of morphological analysis. The phrase translation generation unit 620 generates a phrase translation by translating the translation-target phrase by referring to the categorized dictionaries 175a and 175b with respect to each of the words, etc., in the document recognized on the basis of the results of morphological analysis and structural composition analysis. If prioritized use of the categorized dictionary 175b is determined in step S710, the phrase translation generation unit 620 translates the phrase by using the categorized dictionary 175b with priority to generate a phrase translation.

Subsequently, the phrase translation generation unit 620 generates, on the basis of the translation-target phrase and the phrase translation of the phrase, an updating dictionary used for updating of the translation dictionary 117 (S730). In the updating dictionary generated by the phrase translation generation unit 620, identification information for identifying the registration category in which the phrase and the phrase translation of the phrase are to be registered or the categorized dictionary 115 in which the phrase is to be registered is held by being related to the phrase.

The phrase translation unit 180 performs processing from S700 to S730 with respect to the phrases which are stored in the category-by-cateqory registration phrase recording files 145a and 145b, and which are to be registered in the translation dictionary 117 (S740).

In the above-described phrase translation unit 180, when the translation word generation unit 600 and the phrase translation generation unit 620 generate a phrase translation of a phrase to be registered, they use the categorized dictionary 175 corresponding to the category in which the phrase should be registered, and can generate the phrase translation on the basis of prioritized use of translations of words and phrases used in the category in which the phrase to be registered, thus improving the phrase translation accuracy.

FIG. 9 shows the flow of network-mediated phrase translation generation processing in the phrase translation unit 180 in this embodiment. The phrase translation unit 180 performs processing shown in FIG. 9 in the step S720 shown in FIG. 8 in the case of generating a phrase translation by using pages on a network such as the Internet.

The translation word generation unit 600 first translates a translation-target phrase and generates one or more phrase translation candidates as candidates for a phrase translation (S800). The page search unit 610 then searches pages on the network to find pages containing the phrase translation candidates (S810). The phrase translation generation unit 620 makes a selection as to whether or not one of the phrase translation candidates should be selected as a phrase translation on the basis of whether or not any page containing the phrase translation candidate has been hit (S820).

For instance, in a case where the translation-target phrase is "enterprise software", the translation word generation unit 600 generates "計画ソフトウェア", "事業ソフトウェア" and "企業ソフトウェア" as phrase translation candidates. Subsequently, the page search unit 610 performs a search to find pages containing the phrase translation candidate "計画ソフトウェア", pages containing the phrase translation candidate "事業ソフトウェア" and pages containing the phrase translation candidate "企業ソフトウェア". If some pages containing "企業ソフトウェア" are hit while no page containing "計画ソフトウェア" or "事業ソフトウェア" is hit, the phrase translation generation unit 620 selects "企業ソフトウェア" as a phrase translation.

If pages containing some of the plurality of phrase translation candidates are hit, the phrase translation generation unit 620 may select the phrase translation candidate corresponding to the largest number of hit pages. Alternatively, the phrase translation generation unit 620 may select the phrase translation candidate most frequently hit on pages on the network.

The phrase translation unit 180 may perform the above-described processing by a method described below.

First, the translation word generation unit 600 translates each of words contained in a translation-target phrase and generates one or more translation words corresponding to the word in the phrase by referring to the categorized dictionaries 175a and 175b (S800). The page search unit 610 then searches pages on the network to find pages containing at least one word in each of the groups of translation words corresponding to the translation-target words, and makes this search with respect to all the words contained in the translation-target phrase (S810). The phrase translation generation unit 620 generates a phrase translation on the basis of words and phrases on the searched pages containing at least one word in each of the groups of translation words corresponding to all the words contained in the phrase (S820).

For instance, in a case where the translation-target phrase is "enterprise software", the translation word generation unit 600 translates "enterprise" and "software" contained in the phrase to generate translations for "enterprise": {計画, 事業, 企業} and a translation word {ソフトウェア} for "software". Subsequently, the page search unit 610 searches pages on the network to find pages each containing at least one word in each of the groups of translation words corresponding to the words contained in the translation-target phrase, i.e., a page A containing "計画" and "ソフトウェア", a page B containing "事業" and "ソフトウェア" and a page C containing "企業" and "ソフトウェア". The phrase translation generation unit 620 generates a phrase translation on the basis of word and phrases on the pages A to C containing at least one word in each of the groups of translation words for all the words contained in the phrase. In this instance, if "計画ソフトウェア" and "事業ソフトウェア" are not described in any portion of the pages A and B, and if the page C has a portion where "企業ソフトウェア" is described, the portion "企業ソフトウェア" on the page C containing at least one word in each of the groups translation words for all the translation-target words is selected as a phrase translation of "enterprise software".

In the above-described processing, the phrase translation generation unit 620 may generate a phrase translation on the basis of the numbers of hit pages in search results. That is, in the above-described instance, the phrase translation generation unit 620 may generate a phrase translation by selecting the words corresponding to pages having a number of hits which is the largest of the number of hits of pages containing "計画" and "ソフトウェア", the numbers of hit of pages containing "事業" and "ソフトウェア" and the numbers of hits of pages containing "企業" and "ソフトウェア".

FIGS. 10(*a*) and 10(*b*) show an example of the results of translation by the document translation unit 120 and the phrase translation unit 180 in this embodiment in a case where a registration-object phrase is a noun phrase "Visitor reviews".

FIG. 10(*a*) shows the result of translation in a case where the document translation unit 120 performs sentence-prioritized translation when translating a portion of a document other than a noun phrase.

The morphological analysis unit 210 first performs morphological analysis on a translation-target noun phrase and analyzes words in the phrase as parts of speech or the like. The syntactic analysis unit 230 then performs syntactic analysis on the basis of grammatical rules registered in the categorized dictionaries 175*a* and 175*b*.

In syntactic analysis, the syntactic analysis unit 230 assigns to each English word a cost indicating the degree of lowness of the frequency of use of the part of speech of the English word. For example, the cost at which the English word, "Visitor" is used as a noun is 5, as shown in parentheses in the figure.

Subsequently, the syntactic analysis unit 230 generates a phrase by using a combination described in the grammatical rules registered in the categorized dictionaries 175*a* and 175*b* and assigns a cost to the phrase. In this example, the cost of use as noun+noun is 80, the cost of use of a single noun as a noun phrase is 18, and the cost of use of a single verb as a verb is 15.

The syntactic analysis unit 230 generates a complete sentence by combining the phrases and assigns a cost to the complete sentence. In this example, the cost of construction of noun phrase+verb phrase is 18, and each of the cost of a complete sentence 990*a* formed by a single noun phrase and the cost of a complete sentence 990*b* formed by noun phrase+verb phrase is 200.

The syntactic analysis unit 230 computes the sum of the costs with respect to the complete sentences 990*a* and 990*b* analyzed as described above. For example, the sum of the costs of the complete sentence 990*a* is "noun (5)+noun (5)+noun phrase (80)+complete sentence (200)=290". On the other hand, the sum of the costs of the complete sentence 990*b* is 261.

As a result of the above-described syntactic analysis, the syntactic analysis unit 230 outputs a grammar having the smallest value as the sum of costs, i.e., a grammar by which "Visitor reviews" is translated into the complete sentence 990*b*, as a syntactic analysis result. According to this grammar, the document translation generation unit 240 outputs a translation result "訪問者はレビューする".

FIG. 10(*b*) shows the result of translation in a case where the phrase translation unit 180 performs noun phrase-prioritized translation. In the case of generation of a noun phrase translation, the phrase translation unit 180 assigns a higher priority to use of a grammatical rule for a translation result as a noun phrase in comparison with translation of a portion of a document other than a noun phrase by the document translation unit 120. That is, as shown in FIG. 10(*b*), the cost of the complete sentence formed only of the noun phrase shown in FIG. 10(*a*) is determined by subtracting a predetermined value, e.g., 150 from the cost of the complete sentence 990*b*. The syntactic analysis unit 616 outputs a grammar by which "Visitor reviews" is translated into the complete sentence 990*a* as a result of syntactic analysis of "Visitor reviews". According to this grammar, the phrase translation generation unit 620 outputs a translation result "訪問者レビュー".

As described above, the phrase translation unit 180 prioritizes a grammatical rule for a noun phrase-prioritized translation in the case of generating a noun phrase translation in comparison with translation of a portion other than the noun phrase. More specifically, the phrase translation unit 180 assigns a higher priority to a grammatical rule for a noun phrase-prioritized translation in the case of translating a noun phrase to be registered, in comparison with a grammatical rule for translation into a sentence formed of a combination of a noun and a verb.

The phrase translation unit 180 may register in at least one of the categorized dictionaries 175*a* and 175*b* a noun-phrase grammatical rule which is provided as a method for noun phrase-prioritized translation and used by the phrase translation unit 180 in translation of a noun phrase.

The above-described phrase translation unit 180 sets a higher priority for use of a grammatical rule for a translation result as a noun phrase in the case of generating a noun phrase translation of a noun phrase extracted from a translation-target document, in comparison with translation of a portion other than the noun phrase in the document. In this manner, the phrase translation unit 180 can perform translation suitable for extracted noun phrases, such that the accuracy of translation is improved.

FIG. 11 shows an example of a hardware configuration of a computer 1000 in this embodiment. The translation front end system 100 and/or the dictionary updating server 160 of this embodiment are implemented by using the computer 1000. The computer 1000 has a CPU 1100, CPU peripheral components, i.e., a RAM 1120, a graphic controller 1175 and a display device 1180, which are connected to each other by a host controller 1182. The computer 1000 also has a communication interface 1130, a hard disk drive 1140, and an input/output unit having a CD-ROM drive 1160. These components are connected to the host controller 1182 by an input/output controller 1184. The computer 1000 further has a ROM 1110 and a legacy input/output unit having a flexible disk drive 1150 and an input/output chip 1170. These components are connected to the input/output controller 1184.

The host controller 1182 connects the RAM 1120 to the CPU 1100 and the graphic controller 1175, which access the RAM 1120 at a high transfer rate. The CPU 1100 operates on the basis of programs stored in the ROM 1110 and the RAM 1120 and controls each component. The graphic controller 1175 obtains image data formed on a frame buffer provided in the RAM 1120 by the CPU 1100 or the like, and displays the image data on the display device 1180. Alternatively, the graphic controller 1175 may incorporate a frame buffer for storing image data formed by the CPU 1100 or the like.

The input/output controller 1184 connects the communication interface 1130, which is an input/output device of a comparatively high speed, the hard disk drive 1140 and the CD-ROM drive 1160 to the host controller 1182. The communication interface 1130 performs communication with other units via a network. The hard disk drive 1140 stores programs and data used by the computer 1000. The CD-ROM drive 1160 reads out a program or data from a CD-ROM 1195 and provides the read program or data to the RAM 1120 and/or the hard disk drive 1140.

To the input/output controller 1184, the ROM 1110 and input/output devices of a comparatively low speed such as the flexible disk drive 1150 and the input/output chip 1170 are connected. The ROM 1110 stores a boot program which is executed at the time of startup of the computer 1000, a program dependent on the hardware of the computer 1000, etc. The flexible disk drive 1150 reads a program or data from a flexible disk 1190 and provides the read program or data to the CPU 1100 and/or the hard disk drive 1140 via the input/output controller 1184. To the input/output chip 1170, the flexible disk 1190 and various, input/output devices are connected, for example, through a parallel port, a serial port, a keyboard port, a mouse port, and the like.

A program to be provided to the CPU 1100 via the RAM 1120 is provided by a user in a state of being stored on a recording medium such as the flexible disk 1190, the CD-ROM 1195 or an IC card. The program is read out from the recording medium, is installed in the computer 1000 via the input/output controller 1184 and the RAM 1120, and is executed by the CPU 1100.

A program installed in and executed by the computer 1000 to enable the computer 1000 to operate as the translation front end system 100 has document translation modules including a dictionary management module, a morphological analysis module, a phrase extraction module, a syntactic analysis module, a document translation generation module, and a document category selection module. This program or these modules enable the computer 1000 to function as a document translation unit 120 including the dictionary management unit 200, the morphological analysis unit 210, the phrase extraction unit 220, the syntactic analysis unit 230, the document translation generation unit 240, and the document category selection unit 250. The translation dictionary recording unit 110 and the extracted phrase recording unit 125 may be implemented as the hard disk drive 1140 or a recording medium on a server connected to a network.

A program installed in and executed by the computer 1000 to enable the computer 1000 to operate as the dictionary updating server 160 has a registration phrase selection module, a registration destination selection module including a category-by-category-basis appearance frequency computation module and a registration destination category selection module, a phrase translation module including a translation word generation module, a page search module, a morphological analysis module, a syntactic analysis module and a phrase translation generation module, and a dictionary registration module. This program or these modules enable the computer 1000 to operate as the registration phrase selection unit 400, the registration destination selection unit 410 including the category-by-category-basis appearance frequency computation unit 420 and the registration destination category selection unit 430, the phrase translation unit 180 including the translation word generation unit 600, the page search unit 610, the morphological analysis unit 613, the syntactic analysis unit 616 and the phrase translation generation unit 620, and the dictionary registration unit 190. The registration phrase recording unit 140, the translation dictionary recording unit 170 and the updating dictionary 185 may be implemented as the hard disk drive 1140 or a recording medium on a server connected to a network.

The above-described programs or modules may be stored on an external storage medium. As this storage medium, an optical recording medium such as a DVD or a PD, a magneto-optical recording medium such as an MD, a tape medium or a semiconductor memory such as an IC card may be used as well as the flexible disk 1190 and the CD-ROM. Also, a storage device such as a hard disk or a RAM provided in a server system connected to a special-purpose communication network or the Internet may be used as a recording medium to provide the programs to the computer 1000 via the network.

While the present invention has been described with respect to the embodiment thereof, the technical scope of the present invention is not limited to the scope described in the above description of the embodiment. Various modifications and changes may be made in the above-described embodiment. From the description in the appended claims, it is apparent that a form of the present invention including such modifications and changes is also included in the technical scope of the present invention.

According to the above-described embodiment, a translation system, a dictionary updating server, a translation method and a program and a recording medium in the system, server and method shown in items below can be implemented.

(Item 1)

A translation system for translating a document, having a dictionary management unit for managing a plurality of categorized dictionaries classified according to predetermined categories, a phrase extraction unit for extracting a noun phrase from the document, a registration destination selection unit for selecting a category on which the extracted noun phrase should be registered among a plurality of categories corresponding to the plurality of categorized dictionaries, respectively, a translation unit for translating the noun phrase to generate a noun phrase translation which is a translation of the noun phrase, and a dictionary registration unit for registering a pair of the noun phrase and the noun phrase translation on the categorized dictionary corresponding to the category selected by the registration destination selection unit.

BRIEF DESCRIPTION OF THE DRAWINGS

FIG. 1 shows the configuration of a translation system 10 in an embodiment of the present invention;

FIG. 2 shows an example of the hierarchical structure of a translation dictionary 117 and a .translation dictionary 177 stored in a translation dictionary recording unit 110 and a translation dictionary recording unit 170 in the embodiment of the present invention;

FIG. 3 shows the configuration of a document translation unit 120 in the embodiment of the present invention;

FIG. 4 shows the flow of processing in the document translation unit 120 in the embodiment of the present invention;

FIG. 5 shows the configuration of a phrase classification unit 130 in the embodiment of the present invention;

FIG. 6 shows the flow of processing in the phrase classification unit 130 in the embodiment of the present invention;

FIG. 7 shows the configuration of a phrase translation unit 180 in the embodiment of the present invention;

FIG. 8 shows the flow of processing in the phrase translation unit 180 in the embodiment of the present invention;

FIG. 9 shows the flow of network-mediated phrase translation generation processing in the phrase translation unit 180 in the embodiment of the present invention;

FIGS. 10(*a*) and 10(*b*) show an example of the results of translation in the document translation unit 120 and the phrase translation unit 180 in the embodiment of the present invention. FIG. 10(*a*) shows a translation result in the case of sentence-prioritized translation. FIG. 10(*b*) shows a translation result in the case of noun phrase-prioritized translation; and FIG. 11 shows an example of a hardware configuration of a computer 1000 in the embodiment of the present invention.

| [Description of symbols] | |
|---|---|
| 10 | Translation system |
| 100 | Translation front end system |
| 110 | Translation dictionary recording unit |
| 115a, 115b | Categorized dictionary |
| 117 | Translation dictionary |
| 120 | Document translation unit |
| 125 | Extracted phrase recording unit |
| 127 | Phrase receiving unit |
| 130 | Phrase classification unit |
| 140 | Registration phrase recording unit |
| 145a, 145b | Category-by-category-basis registration phrase recording file |
| 160 | Dictionary updating server |
| 170 | Translation dictionary recording unit |
| 175a, 175b | Categorized dictionary |
| 177 | Translation dictionary |
| 180 | Phrase translation unit |
| 185 | Updating dictionary |
| 190 | Dictionary registration unit |
| 200 | Dictionary management unit |
| 210 | Morphological analysis unit |
| 220 | Phrase extraction unit |
| 230 | Syntactic analysis unit |
| 240 | Document translation generation unit |
| 250 | Document category selection unit |
| 400 | Registration phrase selection unit |
| 410 | Registration destination selection unit |
| 420 | Category-By-Category-Basis appearance frequency |

The invention claimed is:

1. A translation system for translating a document, comprising:
   a dictionary management unit for managing a plurality of categorized dictionaries classified according to predetermined categories;
   a phrase extraction unit for extracting a noun phrase from said document;
   a registration category selection unit for selecting a category into which said extracted noun phrase is registered among a plurality of categories corresponding to said plurality of categorized dictionaries, respectively;
   a translation unit for translating said noun phrase to generate a noun phrase translation which is a translation of said noun phrase;
   a dictionary registration unit for registering a pair of said noun phrase and said noun phrase translation on said categorized dictionary corresponding to the category selected by said registration category selection unit;
   a document category selection unit for selecting the category of said document on the basis of the frequencies of use of said plurality of categorized dictionaries in translation of said document; and
   a registration destination selection unit selects a category into which said extracted noun phrase is registered on the basis of the category selected by said document category selection unit.

2. The translation system according to claim 1, wherein said document category selection unit selects the category of each of said plurality of documents on the basis of the frequencies of use of said plurality of categorized dictionaries in translation of said plurality of documents, and wherein said phrase extraction unit extracts said noun phrase from said plurality of documents, and said registration destination selection unit selects a category into which said extracted noun phrase is registered, on the basis of the frequencies of appearance of said noun phrase in said plurality of documents and the categories of the documents.

3. The translation system according to claim 2, further comprising a registration phrase selection unit for selecting inhibiting the pair of said noun phrase and said noun phrase translation from being registered in any one of said plurality of categorized dictionaries if the frequency with which said noun phrase appears in said plurality of documents is lower than a predetermined lower limit value.

4. The translation system according to claim 1, wherein one of said plurality of categorized dictionaries is a base dictionary in which words and phrases not classified into any one of the plurality of categories corresponding to another plurality of categorized dictionaries are registered, and said registration destination selection unit has:
   a category-by-category-basis appearance frequency computation unit for computing the frequency of appearance of said noun phrase with respect to each of said plurality of categories on the basis of the frequencies of appearance of said noun phrase in said plurality of documents and the categories of the documents; and
   a registration destination category selection unit for making a selection as to in which one of said plurality of categorized dictionaries the pair of said noun phrase and said noun phrase translation is registered, on the basis of said frequencies of appearance of the noun phrase with respect to said plurality of categories, wherein said dictionary registration unit registers the pair of said noun phrase and said noun phrase translation in said base dictionary when said registration destination category selection unit selects registration of said noun phrase in said base dictionary.

5. The translation system according to claim 1, wherein said registration destination selection unit selects a category into which said extracted noun phrase is registered on the basis of the degrees of appearance of said noun phrase with respect to the plurality of categories corresponding to said plurality of documents.

6. The translation system according to claim 1, wherein said translation unit translates said noun phrase to generate said noun phrase translation on the basis of prioritized use of said categorized dictionary corresponding to the category which is selected by said registration destination selection unit and into which said extracted noun phrase is registered.

7. The translation system according to claim 1, wherein said translation unit sets a higher priority for use of a grammatical rule for a translation result as a noun phrase in the case of generating said noun phrase translation, in comparison with translation of a portion other than the noun phrase in said document.

8. The translation system according to claim 1, wherein said translation unit has:
   a translation word generation unit for generating a noun phrase translation candidate as a candidate for said noun phrase translation;
   a page search unit for searching pages on a network to find pages containing said noun phrase translation candidate; and
   a noun phrase translation generation unit which makes a selection as to whether or not said noun phrase translation candidate is selected as said noun phrase translation on the basis of whether or not any page containing said noun phrase translation candidate has been hit.

9. A dictionary updating server for updating dictionaries for use in translating a document at a terminal managing a plurality of categorized dictionaries classified according to predetermined categories, comprising:

a noun phrase receiving unit for receiving a noun phrase extracted from said document from said terminal;

a registration category selection unit for selecting a category into which said extracted noun phrase is registered among a plurality of categories corresponding to said plurality of categorized dictionaries, respectively;

a translation unit for translating said noun phrase received from said terminal to generate a noun phrase translation which is a translation of said noun phrase;

a dictionary registration unit for registering a pair of said noun phrase and said noun phrase translation on said categorized dictionary corresponding to the category selected by said registration category selection unit;

a document category selection unit for selecting the category of said document on the basis of the frequencies of use of said plurality of categorized dictionaries in translation of said document; and a registration destination selection unit selects a category into which said extracted noun phrase is registered on the basis of the category selected by said document category selection unit.

10. A translation system for translating a document, having a terminal for updating dictionaries for use in the translation on the basis of an instruction from an external dictionary updating server, wherein said terminal comprising:

a translation dictionary recording unit for storing a plurality of categorized dictionaries classified according to predetermined categories;

a phrase extraction unit for extracting a noun phrase from said document; and a document translation unit for translating said document by using said plurality of categorized dictionaries, wherein said dictionary updating server comprising:

a registration category selection unit for selecting a category into which said extracted noun phrase is registered among a plurality of categories corresponding to said plurality of categorized dictionaries, respectively;

a translation unit for translating said noun phrase to generate a noun phrase translation which is a translation of said noun phrase;

a dictionary registration unit for issuing an instruction to register a pair of said noun phrase and said noun phrase translation to said categorized dictionary corresponding to the category selected by said registration category selection unit, wherein said translation dictionary recording unit registers the pair of said noun phrase and said noun phrase translation on said categorized dictionary corresponding to the category selected by said registration category selection unit on the basis of the registration instruction issued by said dictionary registration unit; and a document category selection unit for selecting the category of said document on the basis of the frequencies of use of said plurality of categorized dictionaries in translation of said document; and a registration destination selection unit selects a category into which said extracted noun phrase is registered on the basis of the category selected by said document category selection unit.

* * * * *